Patented Apr. 10, 1951

2,548,428

UNITED STATES PATENT OFFICE 2,548,428

PREPARATION OF QUATERNARY AMINES FROM TERTIARY AMINES AND BETA-LACTONES

Fred T. Fiedorek, Oakdale, Calif., assignor to The B. F. Goodrich Company, New York, N. Y., a corporation of New York No Drawing. Application May 6, 1949, Serial No. 91,856

8 Claims. (Cl. 260—248.5)

This invention relates to the preparation of nitrogen and oxygen containing organic compounds, particularly certain quaternary amines which are betaine-type compounds, and pertains particularly to the preparation of such compounds by the reaction of tertiary amines with beta-lactones.

It is disclosed in U. S. Patent 2,356,459 to Frederick E. Küng that beta-lactones, that is, lactones or inner esters of beta-hydroxy carboxylic acids, may be obtained in good yields by the reaction of a ketene with an aldehyde or ketone. In this manner, beta-propiolactone (also called hydracrylic acid lactone) which has the structure

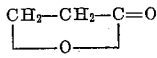

is economically obtained from ketone and formaldehyde.

I have now discovered that beta-propiolactone, and also the liquid homologs thereof (that is, liquid saturated aliphatic beta-lactones) will react with tertiary amines either in aqueous solution, in a substantially organic medium, or even in the absence of any solvent or diluent in such a way that the beta carbon atom of the beta-lactone is connected to the nitrogen atom of the tertiary amine to form in very high yields quaternary amines, that is, organic derivatives of ammonium hydroxide in which the hydroxyl group and the four hydrogen atoms are replaced by radicals. Such quaternary amines possess the general formula

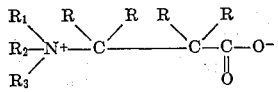

wherein each R is selected from the class consisting of hydrogen and lower alkyl, and $R_1$, $R_2$ and $R_3$ are organic radicals. They exhibit salt-like properties and tend to be hygroscopic, the latter property probably being associated with the tendency for the compounds to undergo hydrolysis to form a quaternary ammonium hydroxide:

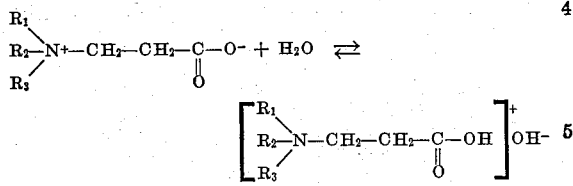

The quaternary amines of this invention are named as derivatives of betaine and the reaction whereby they are obtained is believed to proceed substantially as shown by the following equation, wherein R, $R_1$, $R_2$, and $R_3$ have the same meaning as given hereinabove:

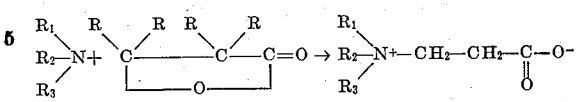

This reaction provides a convenient and economical method of obtaining numerous organic compounds useful as organic intermediates and for other purposes, many of which compounds have not heretofore been prepared or have been obtained only with difficulty and/or from relatively costly raw materials.

As has been indicated hereinabove, the reaction with saturated aliphatic beta-lactones to form quaternary amines is characteristic of all tertiary amines, that is, amines in which three carbon atoms are attached to the same trivalent nitrogen atom, and accordingly any of the known tertiary amines will react with beta-lactones within the scope of the present invention. Within the broad class of tertiary amines those which contain from 4 to 12 carbon atoms and wherein each amine nitrogen is connected by each of its three valences to a methylene group, that is, as follows,

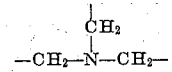

are preferred amines for the reaction. The nature of the radicals attached to the methylene groups is in no manner critical and may be varied widely. Included within this class of tertiary amines are trialkyl amines and especially such tertiary amines which are composed solely of carbon, hydrogen and nitrogen, such as trimethylamine, triethylamine, tripropylamine, methyldisec-butyl amine, thibutyl amine, tripentylamine, tridecylamine, N,N'-tetraethyl ethylene diamine and the like;

Tertiary amines wherein one to three of the valences on the amine nitrogen atom are satisfied by hydroxyalkyl radicals, such as triethanolamine, ethyl diethanolamine, tripropanolamine, 2-diethylamino propyl alcohol, diethyl ethanolamine, methyl diethanolamine, such amines being particularly desirable for the reaction with beta-lactones;

Tertiary amines of the above structure containing other substituents such as halogen atoms, nitro groups, mercapto groups, carboxyl groups such as N-diethylamino acetic acid, dimethylamino propionic acid, ethylene bisiminodiacetic acid, N-diethylbenzylamine-o-carboxylic acid, N-diethyl anthranilic acid and the like;

Tertiary amines composed solely of carbon, hydrogen and nitrogen atoms and containing ring structures, such as tribenzylamine, hexamethylene-tetramine, N-ethyl piperidine, eucatropine, 1-methyl-3-ethylpiperdine, dimethyl-o-toluidene, N-diethyl aniline, triphenylamine and the like.

Although the tertiary amines having the structure shown above are desirably used in the reaction of this invention, other tertiary amines may be utilized with but small decrease, if any, in yield of the quaternary amine obtained. Dimethyl-m-aminophenol, diethyl - aniline-m-sulfonic acid, 1,2-diethyl glyoxaine, p-diethylamino-benzaldehyde, methylethylallyl amine, N-methyl carbanilide, mercuri-p-diethyl-aminophenyl acetate and the like, are but a few examples of such tertiary amines which illustrate that the nature of the amine reacted with beta-lactone is not critical so long as it contains a trivalent nitrogen atom attached by each of its three valences to a carbon atom.

Beta-propiolactone is the preferred beta-lactone for use in this process, not only because it is more readily available and more economical in cost than other beta-lactones, but also because its use results in the production of highest yields of high quality quaternary amines, and because the quaternary amines directly resulting from its reaction are quite useful chemicals per se, being especially useful as medicinal ingredients and as emulsifying agents, and are also useful intermediates in the preparation of valuable esters, acid halides, as well as for many other uses. However, other saturated aliphatic beta-lactones are also useful in the process, among which are such homologs of beta-propiolactone as beta-butyrolactone, beta - valerolactone, beta - iso-valerolactone, alpha-methyl beta-propiolactone, alpha-ethyl beta-propiolactone, beta - isopropyl beta-propiolactone, beta-methyl beta-valerolactone, etc., all of which are liquids and possess the general structure

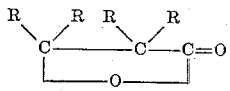

wherein each R is hydrogen or a lower alkyl group, so that the lactone contains from 3 to 6 carbon atoms.

As has been stated above, the reaction of this invention may be carried out in aqueous solution, (in which case the quaternary ammonium hydroxide is formed by hydrolysis of the betaine) in the presence of an inert organic solvent, or simply by admixing the two reactants in the absence of any solvent or diluent. Preferably, an inert organic solvent is utilized since stirring of the reaction mixture and heat removal is thereby facilitated, and the tendency for the beta-lactone to polymerize is repressed. The specific nature and amount of the solvent used, if any, are not at all critical since any polar or non-polar organic solvent may be used so long as it is capable of existing in the liquid state, and is substantially inert to the reactants under the conditions used. It is desirable that the solvent be volatile, preferably that it have a boiling point below 150° C. since it can then be more readily recovered and reused in the process. Specific inert solvents which are effective include benzene, toluene, pentanes, hexanes, and other liquid saturated aliphatic or aromatic hydrocarbons; chlorinated liquid derivatives of such hydrocarbons such as chlorobenzene and ethylene dichloride; liquid ethers such as diethyl ether, dipropyl ether, etc.; liquid esters such as methyl acetate, ethyl acetate, methyl propionate and the like; liquid organic nitriles such as acetonitrile, propionitrile, benzonitrile, etc.; and liquid ketones such as acetone, methyl ethyl ketone, etc. Liquid alcohols are also substantially inert to the reactants under the preferred conditions of the reaction (that is, at temperatures of −30° to 60° C.), despite the fact that alcohols do react with beta-lactones under other conditions. Accordingly, such alcohols may be employed as solvents if desired, examples of suitable alcohol solvents being methanol, ethanol, ethylene cyanohydrin, ethylene chlorohydrin and especially tertiary alcohols such as tertiary butanol, and the like.

No special reaction conditions are necessary in order to carry out the reaction. The quantities of beta-lactone and tertiary amine employed are not critical but it is generally preferred to use equimolecular proportions of lactone and amine or an excess of the amine, for example, from 1 to 2 moles of amine for each mole of lactone.

The reaction is preferably carried out at atmospheric pressure and at a temperature in the range of −30° C. or lower to 100° C. or even higher, more preferably at 0° C. to 50° C. The reaction is exothermic and liberates heat, hence is unnecessary to supply heat externally but it often is desirable to cool the reaction mixture in order to maintain the preferred temperature. However, other temperatures and pressures may be used povided the reactants are maintained in the liquid condition during the reaction.

In carrying out the reaction of this invention, it is generally preferable to add the amine to a solution of the beta-lactone in water or one or more of the solvents listed hereinabove at such a rate that about ½ to 5 hours are required for addition of the entire amount of amine, and with continued agitation of the solution during the addition. However, the beta-lactone may be added to a stirred solution of the amine in an organic solvent, or water, if desired, without affecting the fundamental course of the reaction to give a quaternary amine or any other procedure for bringing the reactants together in an organic medium at −30° C. to 60° C. is also effective. Slow addition of one reactant to the other, and agitation of the solution during reaction are both helpful in maintaining the desired temperature (since the reaction is exothermic and may generate sufficient heat to cause the temperature to rise considerably above 60° C. if heat transfer is not efficient) but are not critical expedients in themselves. The time during which the reactants must be left in contact is likewise not critical and will depend upon the total quantities of reactants being used; in general the reaction is quite rapid and is complete, as evidenced by cessation of heat evolution, within a short time after all of the two reactants have been brought into efficient contact with each other.

As the reaction proceeds, the product usually separates from the reaction mixture in the form of crystals which may be easily separated from unreacted amine and beta-lactone as well as the solvent, if any, simply by filtering. A product of high purity is obtained by recrystallizing the solid product from an organic solvent such as ethanol or methanol. However, other conventional methods of separation may also be used without seriously affecting the yield of the product obtained.

The practice of the invention is further illustrated by the following examples in which all parts are by weight.

*Example I*

36 parts (0.5 mole) of beta-propiolactone are dissolved in 234 parts of acetonitrile. While maintaining the temperature of this solution at 10°–15° C. by external cooling means an excess of gaseous trimethyl amine (generated by slowly adding a 25% aqueous solution of trimethylamine to solid sodium hydroxide, and drying the gas over anhydrous calcium sulfate before passing it into the solution of the beta-lactone) is bubbled into the lactone solution, the reaction mixture being constantly stirred. A crystalline solid precipitates and is separated from the reaction mixture by filtering. After a single crystallization from ethanol there are obtained 64 parts (98%) of beta-(dimethyl amino)-propionic acid methyl betaine (M. P. 120.5°–121° C., identified by potentiometric titration). The hydrochloride of this betaine, prepared by treating an alcoholic solution of the betaine with concentrated hydrochloric acid gives the following analysis:

|   | Calculated for $C_6H_{14}O_2NCl$ | Found |
|---|---|---|
| N | 8.36 | 8.38, 8.36 |
| Cl | 21.16 | 21.06, 21.01 |

*Example II*

To a solution of 36 parts (0.5 mole) of beta-propiolactone in 234 parts of acetonitrile there are slowly added with constant stirring 74.5 parts (0.5 mole) of triethanolamine, the reaction mixture being maintained at room temperature (about 22° C.). The solid which precipitates from the reaction mixture is removed by filtering and crystallized from ethanol. 15 parts of beta-[(di-2-hydroxyethyl) amino]-propionic acid-2-hydroxyethyl betaine (M. P. 132°–133° C., identified by potentiometric titration and analysis) are obtained.

Analysis:

|   | Calculated for $C_9H_{19}O_5N$ | Found |
|---|---|---|
| C | 48.85 | 48.97 |
| H | 8.65 | 8.52 |
| N | 6.33 | 6.27 |

*Example III*

Example II is repeated except that the triethanolamine is replaced by 59.5 parts (0.5 mole) of methyl diethanolamine. There are obtained 73 parts (76%) of beta-[(di-2-hydroxyethyl)-amino]-propionic acid methyl betaine (M. P. 124.5°–125.5° C.).

Analysis:

|   | Calculated for $C_8H_{17}O_4N$ | Found |
|---|---|---|
| N | 7.33 | 7.18, 7.23 |

*Example IV*

72 parts (1 mole) of beta-propiolactone are dissolved in 235 parts of acetonitrile. While maintaining the temperature of this solution at 30° C., 70 parts (0.5 mole) of hexamethylenetetramine are slowly added in small portions and a crystalline product precipitates from the reaction mixture. This solid material is recovered from the reaction mixture by filtering and is washed first with acetonitrile and secondly with ether. 106 parts (100%) of a betaine of the formula

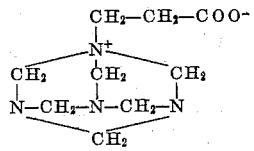

are obtained. Upon crystallizing from aqueous ethanol the hydrated form of the betaine N-(2-carboxyethyl) - hexamethylenetetrammonium hydroxide is formed. Nitrogen analysis:

|   | Calculated for $C_9H_{18}O_3N_4$ | Found |
|---|---|---|
|   | Per cent | Per cent |
| N | 24.33 | 24.05, 24.06 |

The compound decomposes before reaching its melting point.

*Example V*

Example I is repeated except that the acetonitrile is replaced by 300 parts of water. The product, beta-(dimethylamino)-propionic acid methyl betaine hydrolyzes as it forms to the corresponding quaternary ammonium hydroxide. The yield is high, but not so high as those obtained when organic solvents are utilized.

While the above examples illustrate the process of this invention, they by no means include all the various embodiments. Thus, the examples may be repeated with any of the amines set forth hereinabove whereupon still other quaternary amines are obtained in good yield. Moreover, other saturated aliphatic beta-lactones may be substituted for beta-propiolactone, as disclosed, with some reduction in yield but with the obtainment of predominant yields of quaternary amines homologous with those obtained from beta-propiolactone and tertiary amines.

Accordingly, it will be understood that the invention is not intended to be limited to specific embodiments, but only as required by the spirit and scope of the appended claims.

I claim:

1. The method which comprises bringing together in the liquid phase reactants consisting of a saturated aliphatic beta-lactone of the formula

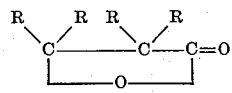

wherein each R is selected from the class consisting of hydrogen and lower alkyl radicals, and a tertiary amine, whereupon a chemical addition reaction occurs, thereby to form a quaternary amine in which the beta carbon atom of the beta-lactone is connected to a nitrogen atom of the tertiary amine.

2. The method which comprises bringing together in the liquid phase reactants consisting of a saturated aliphatic beta-lactone of the formula

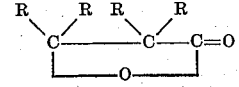

wherein each R is selected from the class consisting of hydrogen and lower alkyl radicals, and a tertiary amine wherein each amine nitrogen is connected by each of its three valences to a methylene group, at a temperature of from —30° C. to 100° C., whereupon a chemical addition reaction occurs, thereby to form a quaternary amine in which the beta carbon atom of the beta-lactone is connected to a nitrogen atom of the tertiary amine and in which the said nitrogen atom is connected by each of its three remaining valences to a methylene group.

3. The method which comprises bringing together reactants consisting of beta-propiolactone and a tertiary amine composed of carbon, hydrogen and nitrogen atoms and wherein each amine nitrogen is connected by each of its three valences to a methylene group, at a temperature of from —30° C. to 100° C., whereupon a chemical addition reaction occurs to form a quaternary amine in which the beta carbon atom of the beta-propiolactone is connected to the nitrogen atom of the tertiary amine and in which said nitrogen atom is connected by three of its valences to hydrocarbon structure, and then recovering said quaternary amine from the reacted liquid mass.

4. The method which comprises bringing together at a temperature of from —30° C. to 100° C. reactants consisting of beta-propiolactone and a tertiary amine of the formula

wherein $R_1$, $R_2$ and $R_3$ are alkyl radicals, whereupon a chemical addition reaction occurs to form a quaternary amine of the formula

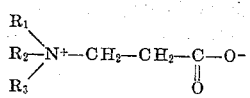

wherein $R_1$, $R_2$ and $R_3$ are alkyl radicals, and then recovering said quaternary amine from the reacted liquid mass.

5. The method of claim 4 wherein the trialkyl amine is trimethyl amine, the quaternary amine recovered being beta-(dimethylamino)-propionic acid methyl betaine of the formula

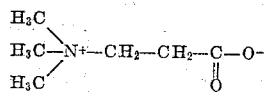

6. The method which comprises bringing together at a temperature of from —30° C. to 100° C. reactants consisting of beta-propiolactone and hexamethylenetetramine whereupon a chemical addition reaction occurs to form a betaine of the formula

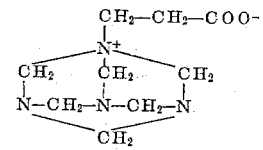

7. The method which comprises bringing together at a temperature of from —30° C. to 100° C. reactants consisting of beta-propiolactone and a tertiary monoamine having at least one hydroxyalkyl radical attached to the amine nitrogen atom whereupon a chemical addition reaction occurs to form a quaternary amine in which the beta carbon atom of the beta-lactone is connected to the nitrogen atom of the tertiary amine and in which the said nitrogen atom is attached by at least one of its valences to a hydroxyalkyl radical, and then recovering said quaternary amine from the reacted liquid mass.

8. The method of claim 7 wherein the tertiary amine is methyl diethanolamine, the quaternary amine recovered being beta-[(di-2-hydroxyethyl)amino] propionic acid-2-hydroxyethyl betaine of the formula $$HO-C_2H_5 \diagdown N^+ - CH_2 - CH_2 - C - O-$$
$$HO-C_2H_5 \diagup \qquad \qquad \qquad \underset{O}{\overset{\|}{}}$$
$$CH_3$$

FRED T. FIEDOREK.

REFERENCES CITED

The following references are of record in the file of this patent:

UNITED STATES PATENTS

| Number | Name | Date |
|---|---|---|
| 2,372,654 | Bergel et al. | Apr. 3, 1945 |
| 2,375,005 | Kung | May 1, 1945 |
| 2,442,143 | Pickel et al. | May 25, 1948 |
| 2,446,651 | Hartung | Aug. 10, 1948 |

OTHER REFERENCES

Johanssen: Chem. Zentral. (1916), II, pp. 557–558.

Basler: Ber. der Deu. Chem., 17 (1884), pp. 1502–1503.